United States Patent [19]
Smith et al.

[11] 4,039,437
[45] Aug. 2, 1977

[54] TREATMENT OF SEWAGE

[75] Inventors: Kenneth Cecil Smith, Roydon; Michael Ernest Garrett, Woking, both of England

[73] Assignee: BOC Limited, London, England

[21] Appl. No.: 575,969

[22] Filed: May 8, 1975

[30] Foreign Application Priority Data
Apr. 8, 1974 United Kingdom ............... 15375/74

[51] Int. Cl.² ............................................. C02C 1/04
[52] U.S. Cl. ........................................ 210/9; 210/17; 210/150; 210/170
[58] Field of Search ............... 210/17, 150, 170, 151, 210/9, 198 R, 209

[56] References Cited
U.S. PATENT DOCUMENTS

| | | | |
|---|---|---|---|
| 3,335,082 | 8/1967 | Ullrich | 210/17 |
| 3,484,836 | 12/1969 | Welch | 210/17 |
| 3,525,685 | 8/1970 | Edwards | 210/170 |

Primary Examiner—Thomas G. Wyse
Attorney, Agent, or Firm—Dennison, Dennison, Meserole & Pollack

[57] ABSTRACT

The invention provides a method of, and apparatus for, treating sewage flowing through a sewer, wherein an oxygenating gas is introduced under pressure into the sewage and is dissolved therein and the thus oxygenated sewage is contact with a matrix of solid material carrying micro-organisms effective to reduce the Biochemical Oxygen Demand of the sewage, the matrix extending across a region inside the sewer. The treatment may be performed in a gravity sewer or in a rising or pumping sewer.

11 Claims, 8 Drawing Figures

TREATMENT OF SEWAGE

BACKGROUND OF THE INVENTION a. Field of Invention

This invention relates to the treatment of sewage whilst it is flowing through a sewer.

b. Description of Prior Art

It has for over fifty years been the established practice to conduct sewage through sewers to a treatment plant in which the sewage is contacted with micro-organisms which break down the offensive portions of the sewage to render it more fit for disposal. In order to keep alive the beneficial micro-organisms, aerobic conditions must be maintained in the sewage. This is usually achieved by aerating the sewage. One disadvantage of this method is that a prolonged treatment is required.

In order to reduce the time required for treatment, it has recently been proposed to oxygenate the sewage in the treatment plant. By this means higher levels of dissolved oxygen can be maintained in the sewage, whereby more rapid treatment is made possible. Often, however, large scale oxygenation plants are either expensive to install or operate. Moreover, such plants can do nothing to reduce the Biochemical Oxygen Demand of the incoming sewage. U.S. Pat. No. 3,607,735 discloses one such plant which has a tubular reactor in which the sewage is oxygenated.

Proposals for treating sewage within a sewer have been made. For example. U.S. Pat. No. 3,525,685 discloses introducing air or other gas into a sewer to prevent the formation of sulphides and to decrease the Biochemical Oxygen Demand of the sewage in the sewer. Our copending application Ser. No. 49,744 discloses an effective method and apparatus for treating sewage in a sewer by dissolving in sewage under pressure substantially all of an oxygenating gas introduced therein.

SUMMARY OF THE INVENTION

It is an aim of the present invention to provide an improved treatment within a sewer itself which makes possible a substantial reduction in the BOD of sewage flowing therethrough.

It is another aim of the present invention to provide within a sewer a matrix of solid material effective to increase the surface area in the sewer effective to increase the surface area in the sewer available for the growth and proliferation of aerobic micro-organisms effective to reduce the Biochemical Oxygen Demand of the sewage.

According to the present invention there is provided a method of treating sewage flowing through a sewer, wherein an oxygenating gas under pressure is introduced into the sewage, and is dissolved therein and wherein the thus oxygenated sewage is contacted with a matrix of solid material carrying micro-organisms effective to reduce the Biochemical Oxygen Demand of the sewage, the matrix extending across a region inside the sewer.

The invention also provides a sewer which has associated therewith means for introducing oxygenating gas under pressure into sewage flowing through the sewer and dissolving it in the sewage, and which has extending across a region inside it a matrix of solid material adapted to carry micro-organisms effective to reduce the Biochemical Oxygen Demand of the oxygenated sewage.

By the term 'oxygenating gas', as used herein, is meant substantially pure oxygen or a mixture of gases containing more than 21.5% by volume of oxygen. It is in general preferred to use an oxygenating gas containing at least 90% by volume of oxygen, and preferably at least 95% by volume of oxygen.

The matrix of solid material should desirably offer a large surface area for supporting micro-rorganisms. It can, for example, take the form of rashing rings or particulate material such as clinker. Such material can conveniently be formed as a bed supported in a container whose walls have passages for the flow of liquid therethrough. It is not necessary, however, for the matrix to be a bed or indeed to use particulate material. Indeed, the matrix can take the form of several longitudinally spaced apart pieces of wire mesh (or other such sheet material with passages for liquid flow therethrough) suspended generally vertically.

A preferred form of matrix comprises a plurality of channels or tubes extending generally longitudinally within the sewer. The channels can all be circular or polygonal (for example, hexagonal) in cross-section. They can be fabricated with the sewer or located therein after the sewer has been established on site.

Another preferred form of matrix comprises a plurality of radially-disposed fins (or ribs) on the inner wall of the sewer. The fins are desirably integral with the sewer and can be cast in the sewer. The fins may at their greatest radial extents reach almost to the longitudinal axis of the sewer. The fins preferably have smooth profiles so as to prevent the fins from becoming clogged with rags and other material in the sewage. Thus use of fins as the matrix offers the advantage of causing little obstruction to the flow of sewage through the sewer.

The channels preferably terminate before the end of the section of sewer pipe in which they are located so as to permit the solids to drop into the lower, unobstructed part of the passage.

The matrix in crioss-section desirably extends across a region inside the sewer that is spaced above the bottom of the sewer in the cross-section, an unobstructed passage thus being provided between the support material and the bottom of the sewer. This enables both non-degradable solids and surplus micro-organisms which become detached from the carrier to pass freely along the sewer with the flow of sewage therethrough.

In a rising or pumping sewer the matrix conveniently does not project below the axis of the sewer. If channels or fins within such a sewer provide the matrix, they are thus preferably positioned in the upper part thereof.

In a gravity sewer the matrix is, in cross-section, conveniently generally centrally located. This makes possible contact between the matrix and the sewage when the sewer is part-full.

The sewage itself normally contains the micro-organisms necessary for its treatment provided that suitable aerobic conditions are maintained. If desired, however, suitable strains of micro-organism can be added by introducing activated sludge from a sewage treatment plant into the sewer.

The micro-organisms will naturally collect and proliferate on the and on the inner wall of the sewer. Those collected on the inner wall of the sewer will help in the treatment. Nonetheless, it is believed that the provision of a matrix of solid material within the sewer for the purpose of carrying micri-organisms considerably assists the reduction of the BOD of the sewage. The surface area required to be provided by the matrix will depend on the BOD of the sewage upstream thereof and on the length of sewer in which a chosen dissolved oxygen concentration is to be maintained in the sewage. If this length is short there will be relatively fewer micro-organisms on the sewer wall to assist in the treatment, so that the matrix desirably provides a relatively larger surface area for the support of the micro-organisms. If, on the other hand, a chosen dissolved oxygen concentration is to be maintained in a considerable length of sewer, it will be sufficient for the matrix to provide only a small surface area in comparison to that provided by the inner surface of the sewer itself. The use of such a matrix is advantageous since it causes only a very small obstruction to the flow of sewage through the sewer and causes no great problem as far as its construction and insertion into the sewer is concerned.

Sewage includes both carbonaceous and nitrogenous compounds which need to be oxidised for a fully effective treatment to be made possible.

Conditions that favour oxidation of nitrogenous compounds are different from those that favour oxidation of carbonaceous compounds. In particular, the micro-organisms which effect the oxidation of nitrogenous compounds require a greater quantity of dissolved oxygen than do the micro-organisms which effect the oxidation of carbonaceous compounds. It is thus possible to establish in an upstream region of the sewer a colony of micro-organisms which effect the oxidation of carbonaceous compounds, and in a downstream region of the sewer a colony of micro-organisms which effect the oxidation of nitrogenous compounds. According to the absolute and relative concentrations of nitrogenous and carbonaceous compounds in the sewage, appropriate additions of oxygenating gas can be made along the length of the swewer in order to establish and maintain the separate carbonaceous and nitrogenous colonies.

It is desirable that sufficient dissolved oxygen be maintained in the sewage flowing through the support material so as to ensure that the aerobic micro-organisms are kept alive. The quantity of oxygenating gas that needs to be introduced can be determined empirically. Factors determining the magnitude of this quantity are discussed in the complete specification of our cognate co-pending British application Nos. 1028/73 10080/73 and 38910/73 (Q118). In particular, they include the length of time the sewage is resident in the sewer and the BOD and dissolved oxygen concentration of the incoming material. It is to be appreciated, however, that, in general, greater quantities of oxygen will be required in the process according to the present invention than for the purpose of merely preventing anaerobic bacterial activity in the sewage.

If the process according to the present invention is performed in a gravity sewer, the oxygenating gas is preferably injected into a pressurised stream of water or sewage, which stream is then introduced into the sewage in the sewer. The stream of sewage is preferably taken from sewage flowing through the sewer. The oxygenation may thus be performed in accordance with the process according to our co-pending British applications 1027/73, 10083/73 and 30326/73 (Q119).

If the process according to the present invention is performed in a rising sewer or pumping sewer it is preferred to inject the oxygenating gas directly into the sewage. Preferably, the oxygenating gas is introduced under pressure through a pipe having orifices therein and being disposed in the sewer in the form of fine bubbles, typically having a diameter of 0.05 to 0.15 mm, so as to facilitate its dissolution. For a rising or pumping sewer the oxygenating gas desirably contains at least 98 % by volume of oxygen.

The process according to the present invention makes possible substantial reduction in the BOD of the sewage and thereby leaves the sewage more fit for disposal. Alternatively, if the sewage is fed into a conventional sewage treatment plant the biochemical 'load' that has to be met by the plant is reduced, thereby permitting it to be operated with a greater-than-usual input of sewage.

An example of the process according to the present invention will now be described by way of examples with reference to the accompanying drawings, of which:

Figure 1:
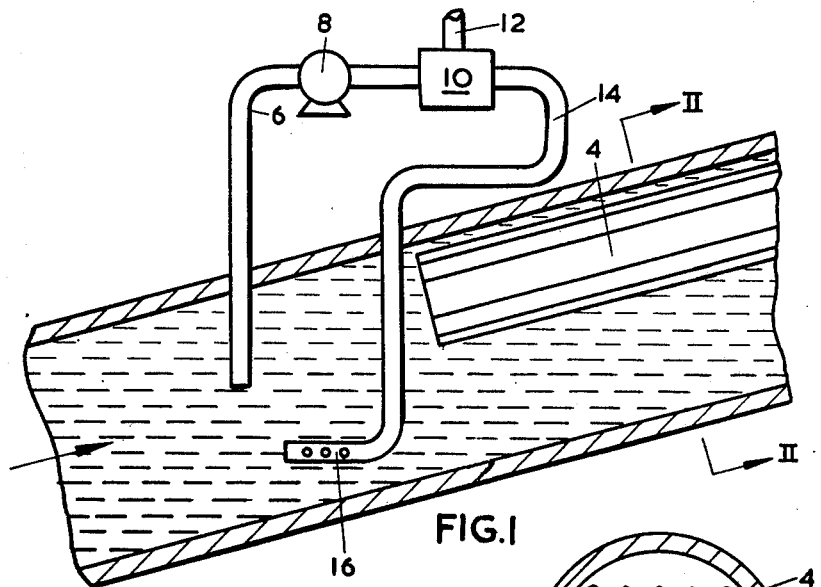
FIG. 1 is a schematic view of a gravity sewer fitted with apparatus for performing the present invention.
Figure 2:
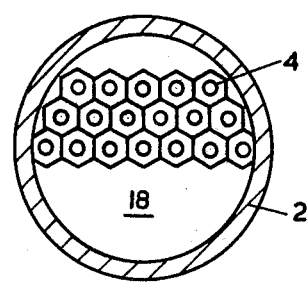
FIG. 2 is a section through line II—II in FIG. 1.

Referring to FIGS. 1 and 2 of the drawings a conduit 6 leads from the interior of an upstream section of a gravity sewer 2 to the inlet of a high pressure pump 8. The outlet of the pump 8 is connected to a conduit 14 which terminates in an injector pipe 16 located below the level of the sewage in the gravity sewer 2 at a region a short distance downstream of the conduit 6. Located in the conduit 14 is a chamber 10 into which extends a gas inector pipe 12 connected to a source of oxygen (not shown).

In the gravity sewer 2 is disposed several hexagonal channels 4 whose inner surfaces carry suitable aerobic micro-organisms. As shown in FIG. 2, a space 18 is left between the bottom of the gravity sewer and the pipes 4 so as to form a passage through which any large non-degradable solid material and surplus micro-organisms discharged from the channels can flow.

In operation, 0.5 to 10% of the flow of sewage is withdrawn from the gravity sewer 2 through the conduit 6 by the pump 8 operating at a pressure of 40 psig. The so-formed pressurised stream of sewage passes into the conduit 14, and oxygen is injected under pressure into it in the chamber 10. This forms an oxygenated stream of sewage which is then returned to the sewer 2 through the injector pipe 16. The thus oxygenated sewage then flows through the channels 4 and the aerobic micro-organisms supported therein act to reduce the BOD of the sewage.

Figure 3:
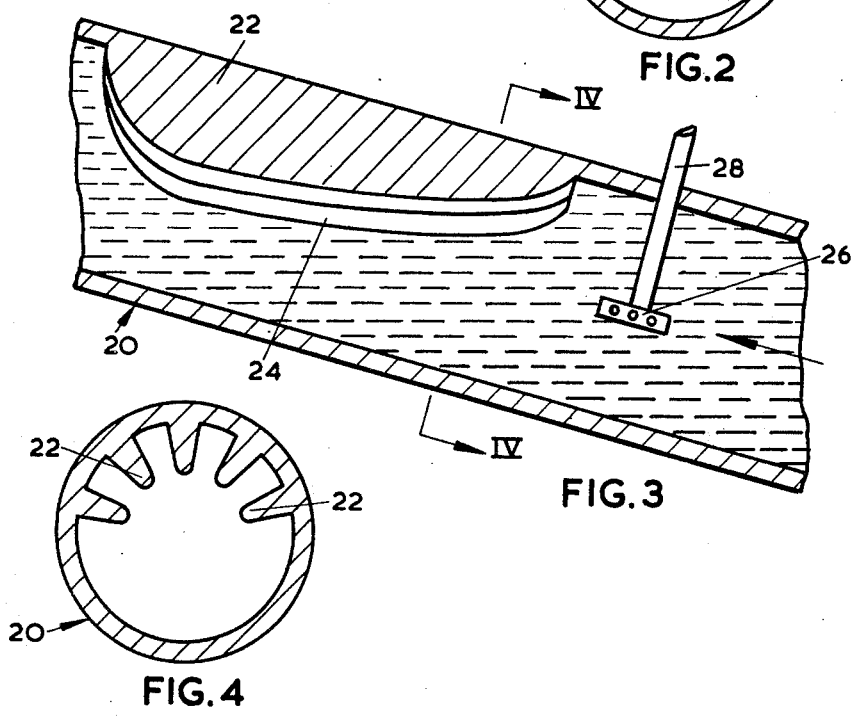
FIG. 3 is a schematic view of part of a rising sewer according to the present invention.
Figure 4:
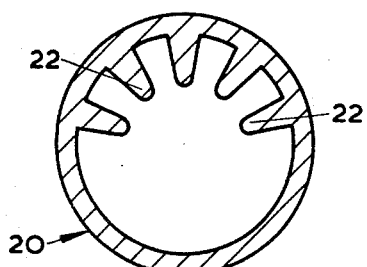
FIG. 4 is a section through line IV—IV in FIG. 3.

In FIGS. 3 and 4 a section of a rising sewer 20 is illustrated. In an upper part of the rising sewer are provided several radially-disposed fins 22 which are integral with the sewer 20. Each of the fins 22 has a smooth, curved periphery 24, and its radial extent increases gradually in the direction of the flow of sewage up to a maximum where the fin reaches almost to the longitudinal axis of the sewer and then decreasess more rapidly to zero.

The sewer can be formed from a number of sections joined end-to-end, each section having one or more sets of fins. Before the fins 22 in the direction of fluid flow is positioned an oxygen injector pipe 26 having orifices adapted to inject pressurised oxygen into the sewer in fine bubbles. The pipe 26 is connected by conduit 28 to a source of oxygen under pressure.

In operation, pressurised oxygen is injected into the sewer during periods when sewage is pumped therethrough. The oxygenated sewage then passes through the finned part of the sewer. Aerobic micro-organisms that have proliferated on the surface provided by the fins 22 act to reduce the BOD of the sewage.

Figure 5:
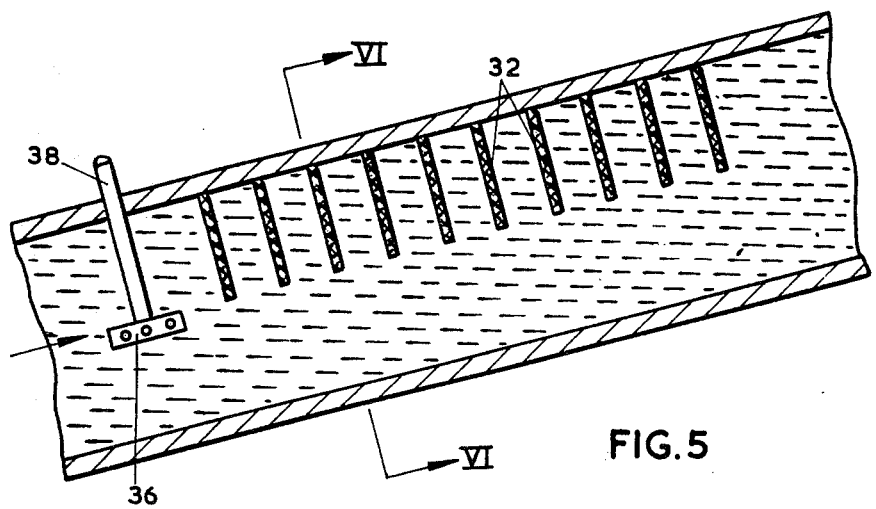
FIG. 5 is a schematic view of part of another rising sewer according to the invention.
Figure 6:
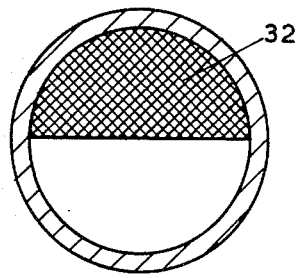
FIG. 6 is a section through line VI—VI of FIG. 5.

In FIGS. 5 and 6 or section of a rising sewer 30 is illustrated. In an upper part of the rising sewer are suspended several longitudinally spaced-apart sheets of wire mesh 32.

The sewer can be formed from a number of sections 30 joined end-to-end.

Before the sheets 32 in the direction of fluid flow is positioned and oxygen injector pipe 36 adapted to inject pressurised oxygen into the sewer in fine bubbles. The pipe 36 is connected by conduit 38 to a source of oxygen under pressure.

In operation, pressurised oxygen is injected into the sewer during periods when sewage is pumped therethrough. The oxygenated sewage then passes through the sheets 32. Aerobic micro-organisms proliferate on the surface provided by the sheets 32 and act to reduce the BOD of the sewage passing therethrough.

Figure 7:
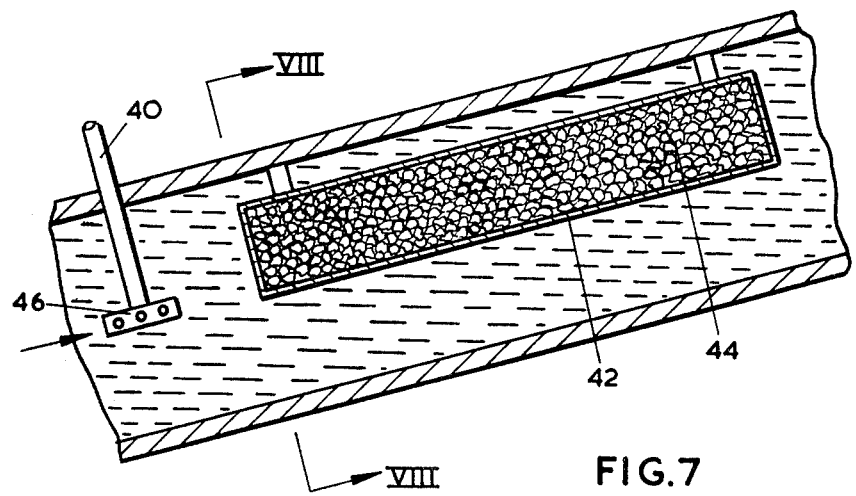
FIG. 7 is a schematic view of part of yet another rising sewer according to the invention.
Figure 8:
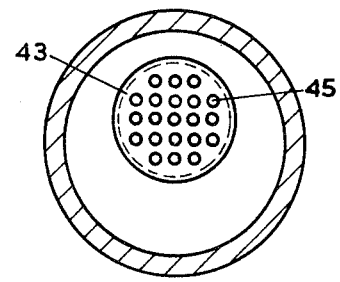
FIG. 8 is a section through line VIII—VIII in FIG. 7.

In FIGS. 7 and 8 a section 40 of a rising sewer is illustrated. In an upper part of the rising sewer is suspended a container 42 in which are located a large number of pieces 44 of solid particulate material such as clinker. The end walls 43 of the container have apertures 45 therein for the passage of sewage therethrough.

The sewer can be formed from a number of sections 40 joined end-to-end.

Before the container 42 in the direction of the flow of sewage is positioned an oxygen injector pipe 46 adapted to inject pressurised oxygen into the sewer in the form of fine bubbles. The pipe 46 is connected by conduit 40 to a source of oxygen under pressure.

In operation, pressurised oxygen is injected into the sewer during periods when sewage is pumped therethrough. The oxygenated sewage then passes through the container 42. Aerobic micro-organisms proliferate on the surface provided by the particulate solid material 44 in the container 42 and act to reduce to BOD of the sewage passing therethrough.

By introducing the oxygenating gas under pressure into sewage under pressure the complete dissolution of the oxygenating gas is facilitated. The complete dissolution of the oxygenating gas avoids the creation of explosive or inflammable oxygen-rich gas mixtures in the ullage space of a gravity sewer and in a rising sewer avoids the formation of pockets of undissolved gas which would give rise to problems in puming the sewage through the sewer.

The matrix of solid material provides a surface area for the proliferation of aerobic micro-organisms in addition to that provided by the inner wall of the sewer itself and thereby increases the effectiveness and extent of BOD reduction that can take place on the addition of a given volume of oxygenating gas into a given volume of sewage.

We claim:

1. In a method of treating sewage flowing through a sewer, wherein an oxygenating gas is injected under pressure into the sewage and is dissolved therein the improvement comprising, contacting the thus oxygenated sewage without obstructing flow of solids along the bottom of the sewer with a stationary matrix means generally supported from the top of the sewer and above the bottom of the sewer extending generally longitudinally in the sewer a significant distance and constructed to permit flow of sewage therethrough for providing an extended area for growth of micro-organisms effective to reduce the Biochemical Oxygen Demand of the sewage, the matrix extending across a region inside the sewer, whereby said matrix is colonized along distinct longitudinally disposed portions with colonies of micro-organisms capable of assimilating at least carbonaceous compounds, wherein the matrix is a bed of solid material within a container having passages in its walls for the flow of liquid therethrough.

2. A method according to claim 1, in which the matrix does not project generally below the central longitudinal axis of the sewer.

3. A method according to claim 1, in which the oxygenating gas contains at least 98% by volume of oxygen.

4. A method according to claim 1, in which the sewer is a gravity sewer and the oxygenating gas is introduced under pressure into a stream of aqueous liquid under pressure, which stream is then introduced into the sewer.

5. A method according to claim 4, in which the stream is taken from the sewage flowing through the sewer.

6. In a method of treating sewage flowing through a sewer, wherein an oxygenating gas is injected under pressure into the sewage and is dissolved therein the improvement comprising, contacting the thus oxygenated sewage without obstructing flow of solids along the bottom of the sewer with a stationary matrix means generally supported from the top of the sewer and above the bottom of the sewer extending generally longitudinally in the sewer a significant distance and constructed to permit flow of sewage therethrough for providing an extended area for growth of micro-organisms effective to reduce the Biochemical Oxygen Demand of the sewage, the matrix extending across a region inside the sewer, thereby said matrix is colonized along distinct longitudinally disposed portions with colonies of micro-organisms capable of assimilating at least carbonaceous compounds, wherein the matrix comprises spaced-apart pieces of sheet material which have passages for the flow of liquid therethrough and which are suspended vertically in the sewer.

7. In a method of treating sewage flowing through a sewer, wherein an oxygenating gas is injected under pressure into the sewage and is dissolved therein the improvement comprising, contacting the thus oxygenated sewage without obstructing flow of solids along the bottom of the sewer with a stationary matrix means generally supported from the top of the sewer and above the bottom of the sewer extending generally longitudinally in the a sewer significant distance and constructed to permit flow of sewage therethrough for providing an extended area for growth of micro-organisms efectiveto reduce the Biochemical Oxygen Demand of the sewage, the matrix extending across a region inside the sewer, whereby said matrix is colonized along distinct longitudinally disposed portions with colonies of micro-organisms capable of assimilating at least carbonaceous compounds, wherein the matrix comprises a plurality of channels extending longitudinally within the sewer provided by a plurality of radially disposed fins on the inner wall of the sewer.

8. A sewer provided with means for injecting oxygenating gas under pressure into sewage flowing through the sewer and including matrix means for providing an extended area for the growth of principally aerobic micro-organisms to reduce the Biochemical Oxygen Demand of the sewage flowing therethrough comprising:
- a. A first stationary matrix for the support of micro-organisms comprising a first colony to effect the oxidation of carbonaceous compounds;
- b. a second stationary matrix for the support of micro-organisms comprising a second colony established to effect the oxidation of nitrogeneous compounds;
- c. said first and second matrixes extending across a region inside the sewer and generally supported from the top of the sewer and terminating above the bottom of the sewer and extending longitudinally a significant distance along the sewer and configured to permit the flow of sewage thererthrough;
- d. said second matrix being positioned in the sewer downstream of said first matrix;
- e. said means for injecting oxygenating gas being positioned upstream of said first and second matrixes and adapted to provide oxen in quantities appropriate to support active growth of said first and second colonies; and
- f. said matrixes of (c) being selected from the group consisting of, (1) a bed of solid material within a container having passages in its walls for the flow of liquid therethrough, (2) a plurality of spaced-apart pieces of sheet material which have passages for the flow of liquid therethrough, and (3) a plurality of longitudinally extending members comprising radially disposed fins on the inner wall of the sewer.

9. A sewer with matrix means generally supported from the top of the sewer and extending downwardly therefrom and extending generally longitudinally in the sewer a significant distance and constructed to permit flow of sewage therethrough for providing an increased surface area for growth of micro-organisms, which matrix means extend across a region inside the sewer, said matrix means not projecting generally below a central longitudinal axis of the sewer, said matrix means being selected from the group consisting of, (1) a bed of solid material within a container having passages in its walls for the flow of liquid therethrough, (2) a plurality of spaced-apart pieces of sheet material which have passages for the flow of liquid therethrough, and (3) a plurality of longitudinally extending members comprising radially disposed fins on the inner wall of the sewer.

10. A sewer acccording to claim 9, in which the sewer is a rising sewer and in which disposed in the sewer is a piper having orifices therein for the injection of oxygenating gas into the sewer.

11. A sewer according to claim 9, in which the sewer is a gravity sewer and including a pump for withdrawing sewage from the sewer under pressure, and means for dissolving oxygenating gas in the sewage withdrawn by the pump and for returning the thus-oxygenated sewage to the sewer.

* * * * *